2,924,554
METHOD OF REPELLING RODENTS WITH FURAN COMPOUNDS

Manlio A. Manzelli, Plainfield, N.J., and Virgil H. Young, Jr., and Charles L. Harowitz, Richmond, Va., assignors to Virginia-Carolina Chemical Corporation, Richmond, Va., a corporation of Virginia No Drawing. Application July 10, 1957
Serial No. 670,889

6 Claims. (Cl. 167—46)

This invention relates to a method of repelling rodents by associating therewith compounds containing the furan nucleus, hereinafter referred to as furan compounds, which exhibit rodent repellent properties.

There is a great need for an effective and relatively inexpensive method of repelling rodents. The Fish and Wildlife Service of the U.S. Department of Interior has tested more than 6500 chemicals as rodent repellents. At present, only a few are considered to have merit as rodent repellents. The annual loss of packaged food products in the United States by rodent damage has been estimated at two billion dollars. The loss of such products by rodent damage throughout the world has not been estimated, to our knowledge, but it is believed to be very high. An object of the present invention, therefore, is to provide a method for protecting materials susceptible to attack by rodents and for preventing at least a substantial part of the losses due to rodents.

Rodent repellents are not to be confused with rodenticides. A rodenticide is a poison and as such it must come into contact with or be eaten by the rodent. Generally, some means must be employed to attract the rodent to the rodenticide. Rodent repellents on the other hand are not necessarily poisons, and their purpose is to repel the rodent from the premises before it does damage. The rodent repellent does not necessarily have to come into contact with the rodent.

The compounds we have found to be effective rodent repellents are all derived from the furan nucleus. Some of the compounds are available commercially in large quantities and some are available only in limited quantities. However, the invention is not concerned with the availability of the compounds, but with their rodent repellent activity.

It is not known at present why the compounds of our invention exhibit the property of rodent repellency. Many different types of compounds derived from the furan nucleus have been found not to possess sufficient rodent repellency to be useful. Some of these types that are not useful are related chemically to our useful types and at present there is no known reason why some of the furan compounds show activity and others do not.

The rodent repellent properties of the furan-derived compounds with respect to food acceptance tests were determined by the following test.

RODENT REPELLENCY TEST

Individual rats were given two feed cups, one containing 20 g. of untreated food, the other containing 20 g. of food treated with the test compound. The repellency index (K) was determined from the daily food consumption by the following formula:

$$K = 100 - 1/100 \ W(8T_1 + 4T_2 + 2T_3 + T_4)(U_1 + U_2 + 2U_3 + 4U_4 + 8X)$$

where $T_1 \ldots T_4$ represent the daily consumption of treated food in grams; $U_1 \ldots U_4$ represent the daily food consumption of untreated food; X is the amount of untreated food remaining at the end of the test and W is the body weight of the animal in kg. The test compounds were applied at different percentages by weight to the food. Generally they were applied in the form of a solution in an inert organic solvent, usually ethanol. The mixture was air dried for 24 hours before being used in the test. The highest index possible is 100. A repellency index of 85 in this test for rodent repellency shows that the compound is a good or useful rodent repellent. An index of less than 85 shows the compound to be unworthy of further evaluation, i.e., it is not a good rodent repellent.

The table which follows shows the name of the compound, its structural formula and the repellency index figures for a concentration of 2% by weight of the test compound based upon the weight of the food material.

*Table I*

RODENT REPELLENCY INDEX OF VARIOUS FURAN-DERIVED COMPOUNDS AT 2% CONCENTRATION

| Name | Structural Formula | K |
|---|---|---|
| 2-chloroethyl 2-furoate | H–C(O)=C–C(=O)–O–CH$_2$–CH$_2$–Cl (furan ring) | 95 |
| Allyl 2-furoate | H–C(O)=C–C(=O)–O–CH$_2$–CH=CH$_2$ (furan ring) | 100 |
| Methyl 5-nitro-2-furoate | O$_2$N–C ... C–C(=O)–OCH$_3$ (furan ring) | 97 |

Table I—Continued.

| Name | Structural Formula | |
|---|---|---|
| Ethyl 5-nitro-2-furoate | $O_2N-C\langle{}^{O}\rangle{}C-CO-OC_2H_5$ (5-nitro-2-furoate ester, ethyl) | 100 |
| Propyl 5-nitro-2-furoate | $O_2N-C\langle{}^{O}\rangle{}C-CO-OC_3H_7$ | 99 |
| 5-nitro-2-furaldehyde | $O_2N-C\langle{}^{O}\rangle{}C-CO-H$ | 96 |
| 5-nitro-2-furoyl chloride | $O_2N-C\langle{}^{O}\rangle{}C-CO-Cl$ | 94 |
| Ethyl 5-nitro-2-furyl ketone | $O_2N-C\langle{}^{O}\rangle{}C-CO-C_2H_5$ | 100 |
| 5-nitrofurfuryl alcohol | $O_2N-C\langle{}^{O}\rangle{}C-CH_2OH$ | 92 |
| 5-nitrofurfuryl bromoacetate | $O_2N-C\langle{}^{O}\rangle{}C-CH_2O-CO-CH_2Br$ | 89 |
| 3-(5-nitrofurfurylideneamino)-2-oxazolidone | $O_2N-C\langle{}^{O}\rangle{}C-CH=N-N(CH_2CH_2O)C=O$ | 94 |
| 5-chloro-2-furoic acid | $Cl-C\langle{}^{O}\rangle{}C-CO-OH$ | 90 |
| 2-furamide | $H-C\langle{}^{O}\rangle{}C-CO-NH_2$ | 85 |
| 2-furyl phenyl ketone | $H-C\langle{}^{O}\rangle{}C-CO-C_6H_5$ | 99 |
| Furfurylamine | $H-C\langle{}^{O}\rangle{}C-CH_2-NH_2$ | 94 |
| 2-furfurylaminopyridine | $H-C\langle{}^{O}\rangle{}C-CH_2-NH-C_5H_4N$ | 86 |
| Furfurin | $(H-C\langle{}^{O}\rangle{}C-)C-CH(-N=CH-C\langle{}^{O}\rangle{}C-H)_2$ | 96 |
| 4-(2-furyl)-3-buten-2-one | $H-C\langle{}^{O}\rangle{}C-CH=CH-CO-CH_3$ | 97.4 |

Some of the compounds in Table I were tested at lower concentrations. These results are given in Table II. The K value was determined by the same experimental technique and formula shown above.

Table II
RODENT REPELLENCY INDEX OF SELECTED FURAN-DERIVED COMPOUNDS AT LOWER CONCENTRATIONS

| Name | K at 1% | K at 0.5% |
| --- | --- | --- |
| allyl 2-furoate | 99 | 97 |
| ethyl 5-nitro-2-furoate | 97 | 96 |
| 5-nitro-2-furaldehyde | 86 | 88 |
| 5-nitrofurfuryl alcohol | 94 | 88 |
| 5-nitrofurfuryl bromacetate | 92 | 80 |
| 3-(5-nitrofurfurylideneamino)-2-oxazolidone | 91 | 85 |
| 2-furyl phenyl ketone | 91 | 96 |
| 2-furfurylaminopyridine | 93 | 90 |

The compounds of our invention are merely associated with the material to be protected. It is not necesary that they be mixed with food to protect it as in the above described tests. They may be used as a coating to cover the container of the food, or they may even be used on the floors, walls and ceilings of buildings wherein food is stored. Further, to protect trees and seedlings from such gnawing animals as beaver, rabbit, and porcupine, our compounds are painted, sprayed or dipped onto the trees and seedlings. They may be applied in solution in an organic solvent or in the form of an aqueous emulsion. The emulsion may or may not contain a binder, e.g., polyvinyl acetate. Further, the compounds of our invention may be used in admixture with a finely divided solid material. The active compound is merely added to the finely divided solid and this mixture is then sprinkled around and onto the area to be protected. In addition to the above, the compounds may be associated with seed prior to planting. This prevents the loss of newly planted seed to field mice. In short, our compounds may be used to protect materials generally which are susceptible to rodent attack by merely associating the compound with the material to be protected in such a way that the rodent is repelled away from the material or object to be protected.

We claim:
1. Process of protecting materials which are susceptible to attack by rodents which comprises protectively associating therewith a compound containing the furan nucleus selected from the group consisting of 2-chloroethyl 2-furoate; allyl 2-furoate; methyl 5-nitro-2-furoate; ethyl 5-nitro-2-furoate; propyl 5-nitro-2-furoate; 5-nitro-2-furaldehyde; 5-nitro-2-furol chloride; ethyl 5-nitro-2-furyl ketone; 5-nitrofurfuryl alcohol; 3-(5-nitrofurfurylideneamino)-2-oxazolidone; 5-chloro-2-furoic acid; 2-furyl phenyl ketone; furfurylamine; 2-furfurylaminopyridine and furfurin.

2. Process as defined in claim 1 in which the compound containing the furan nucleus is 2-chloroethyl 2-furoate.

3. Process as defined in claim 1 in which the compound containing the furan nucleus is allyl 2-furoate.

4. Process as defined in claim 1 in which the compound containing the furan nucleus is ethyl 5-nitro-2-furoate.

5. Process as defined in claim 1 in which the compound containing the furan nucleus is ethyl 5-nitro-2-furyl ketone.

6. Process as defined in claim 1 in which the compound containing the furan nucleus is 2-furyl phenyl ketone.

References Cited in the file of this patent

UNITED STATES PATENTS

| | | |
| --- | --- | --- |
| 2,319,481 | Stillman et al. | May 18, 1943 |
| 2,811,478 | Manzelli et al. | Oct. 29, 1957 |
| 2,847,424 | Ward | Aug. 12, 1958 |

OTHER REFERENCES

Bellack et al.: Relationship Between Chemical Structure and Rat Repellency, p. 112, May 8, 1953; p. 111, item No. 713.

J. of the Am. Phar. Asso., vol 36, November 1947, pp. 350–352.